(12) United States Patent
Bludau et al.

(10) Patent No.: US 7,715,678 B2
(45) Date of Patent: May 11, 2010

(54) OPTICAL FIBER LOOPBACK TEST SYSTEM AND METHOD

(75) Inventors: Thomas E. Bludau, Austin, TX (US); James D. Erhardt, Irving, TX (US); David Scarponi, Parkton, MD (US); George W. Lutgens, Denver, PA (US)

(73) Assignee: 3M Innovative Properties Company, St. Paul, MN (US)

( * ) Notice: Subject to any disclaimer, the term of this patent is extended or adjusted under 35 U.S.C. 154(b) by 40 days.

(21) Appl. No.: 11/670,836

(22) Filed: Feb. 2, 2007

(65) Prior Publication Data

US 2007/0189695 A1 Aug. 16, 2007

Related U.S. Application Data

(60) Provisional application No. 60/743,275, filed on Feb. 10, 2006.

(51) Int. Cl.
 *G02B 6/00* (2006.01)
 *G02B 6/36* (2006.01)
 *G02B 6/38* (2006.01)
(52) U.S. Cl. .................... 385/135; 385/55; 385/76
(58) Field of Classification Search .......... 385/54, 385/55, 59, 71, 73, 76, 86, 135
 See application file for complete search history.

(56) References Cited

U.S. PATENT DOCUMENTS

| | | | |
|---|---|---|---|
| 4,822,954 A | | 4/1989 | Rebers et al. |
| 4,982,083 A | * | 1/1991 | Graham et al. ......... 250/227.11 |
| 5,010,544 A | * | 4/1991 | Chang et al. ................ 370/243 |
| 5,043,976 A | * | 8/1991 | Abiven et al. ................ 398/136 |
| 5,367,159 A | * | 11/1994 | Schofield et al. ........ 250/227.11 |
| 5,436,554 A | | 7/1995 | Decker, Jr. |
| 5,455,672 A | * | 10/1995 | Lamonde et al. ........... 356/73.1 |
| 5,475,781 A | * | 12/1995 | Chang et al. ................... 385/76 |
| 5,978,113 A | | 11/1999 | Kight |
| 6,366,724 B1 | * | 4/2002 | Jennings et al. ............... 385/48 |
| 6,454,464 B1 | | 9/2002 | Nolan |
| 6,647,198 B2 | * | 11/2003 | Holmes ...................... 385/134 |
| 6,707,979 B2 | * | 3/2004 | Wang et al. ................. 385/140 |
| 6,777,617 B2 | * | 8/2004 | Berglund et al. .............. 174/92 |
| 6,802,724 B1 | * | 10/2004 | Mahony ..................... 439/135 |
| 6,868,233 B2 | | 3/2005 | Foltzer |
| 6,937,594 B2 | | 8/2005 | Smith et al. |
| 7,016,340 B1 | | 3/2006 | McKinion |
| 7,075,012 B1 | | 7/2006 | Rebers et al. |
| 7,075,013 B1 | | 7/2006 | Rebers et al. |
| 7,110,668 B2 | | 9/2006 | Gerstel et al. |
| 7,181,138 B1 | | 2/2007 | Gerstel et al. |
| 7,203,420 B1 | | 4/2007 | Collier et al. |
| 2006/0034578 A1 | | 2/2006 | Allen et al. |
| 2006/0153517 A1 | * | 7/2006 | Reagan et al. ............... 385/135 |

\* cited by examiner

*Primary Examiner*—Charlie Peng
(74) *Attorney, Agent, or Firm*—Gregg H. Rosenblatt

(57) ABSTRACT

A telecommunications enclosure includes a housing for retaining telecommunication lines therein, the housing including at least one of a splice closure and a terminal closure. At least one of the terminal closure and the splice closure includes a loopback testing station having at least one coupling mounted therein. The coupling is adapted to receive a first terminated end of a first telecommunication line and adapted to receive a second terminated end of a second telecommunication line. The testing station permits loss testing of installed distribution lines at a terminal from a central network facility.

20 Claims, 4 Drawing Sheets

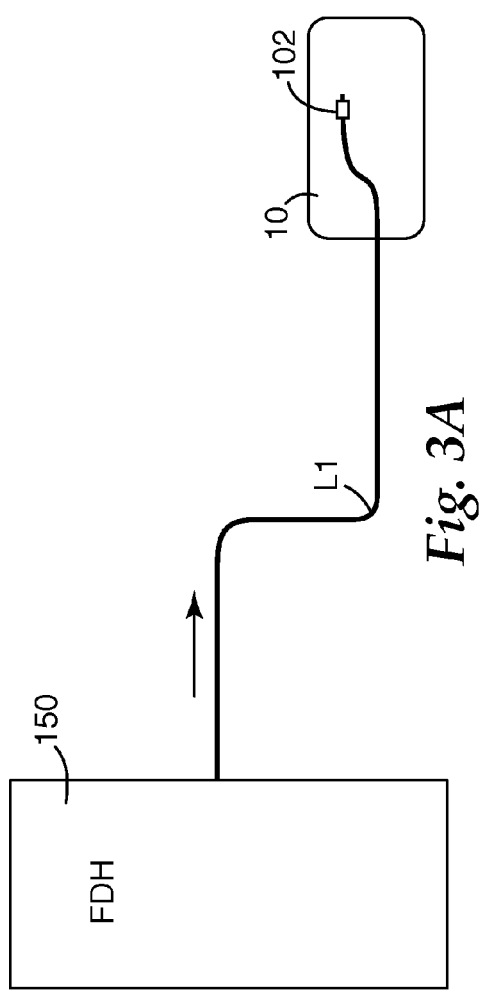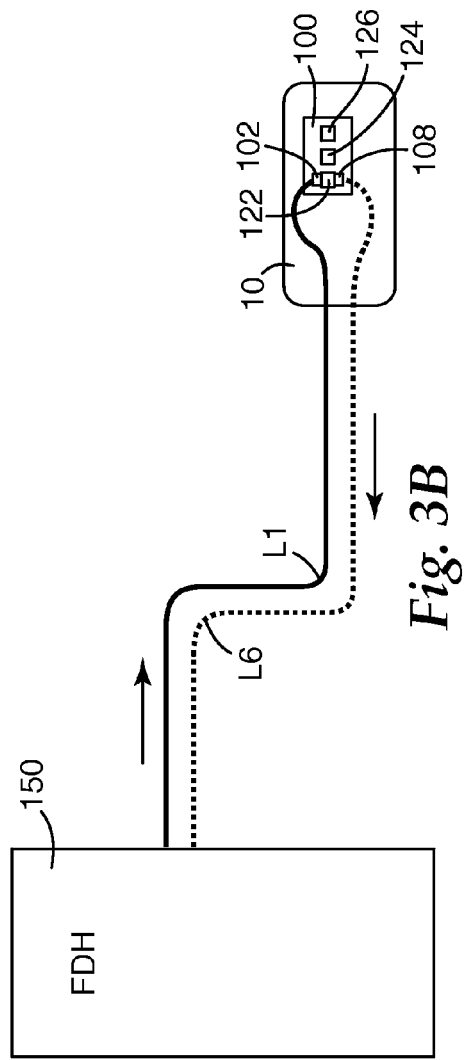

OPTICAL FIBER LOOPBACK TEST SYSTEM AND METHOD

CROSS REFERENCE TO RELATED APPLICATION

This application claims the benefit of U.S. Provisional Patent Application No. 60/743,275, filed Feb. 10, 2006, the disclosure of which is incorporated by reference herein in its entirety.

THE FIELD OF THE INVENTION

The present invention generally relates to telecommunications systems. More particularly, the present invention relates to a loopback test system and method for testing a network, particularly an optical fiber based network.

BACKGROUND OF THE INVENTION

Telecommunication networks based on optical fiber cables are well known. As telecommunication cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines or distribution lines.

In order to assure that an optical fiber-based network performs at the highest level, in regards to speed and reliability, optical tests are often performed during the installation of the network. Some of the testing includes bidirectional optical return loss (ORL) testing and bidirectional end-to-end optical loss testing.

Usually, upon completion of the installation of an interconnection point in the network (such as at a fiber closure, a fiber terminal closure, a fiber terminal, a fiber distribution terminal (FDT), or a fiber distribution hub (FDH)), a technician is dispatched to the location of the interconnection point. The technician is often called on to conduct such network qualification testing for each fiber terminated or interconnected at this specific location. In order to conduct the bidirectional ORL and optical loss tests, a second technician is simultaneously dispatched to the FDH or central office (CO). This process requires the time of two technicians and the use of two optical loss test sets (OLTS) and/or two ORL test sets to conduct the network qualification testing. Also, because fiber terminal closures and fiber terminals are installed typically one unit per every 6 to 8 houses or other drop locations, the technician has to spend valuable time traveling from terminal/closure to terminal/closure to qualify the network for service.

SUMMARY OF THE INVENTION

A first aspect of the invention described herein provides a telecommunications enclosure that includes a housing for retaining telecommunication lines therein. The housing includes a closure adapted to enclose at least one of a splicing closure and a terminal closure. The closure includes a loopback testing station having at least one coupling mounted therein, the coupling adapted to receive a first terminated end of a first telecommunication line and adapted to receive a second terminated end of a second telecommunication line, wherein the first and second telecommunication lines are coupled to a central telecommunications facility.

According to another aspect of the invention, a telecommunications network includes a telecommunications enclosure for retaining telecommunication lines therein. The telecommunications enclosure includes a closure adapted to enclose at least one of a splicing closure and a terminal closure. The closure includes a loopback testing station having at least one coupling mounted therein. The coupling is adapted to receive a first terminated end of a first telecommunication line and is adapted to receive a second terminated end of a second telecommunication line. The telecommunications network further includes a central communications facility coupled to the first and second telecommunications lines.

According to another aspect of the invention, a method of testing a telecommunications network includes providing a telecommunications enclosure for retaining telecommunication lines therein, the telecommunications enclosure including a closure adapted to enclose at least one of a splicing closure and a terminal closure. The closure includes a loopback testing station having at least one coupling mounted therein. The method also includes mounting a first terminated end of a first telecommunication line to a first end of the coupling and mounting a second terminated end of a second telecommunication line to a second end of the coupling, wherein the first telecommunications line is optically coupled to the second telecommunication line. The method also includes sending a test signal along the first telecommunication line from a central facility and receiving the test signal along the second telecommunication line at the central facility.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 3A schematically illustrates a current network testing scheme and FIG. 3B shows a schematic representation of an example loopback test system being utilized in an exemplary loopback testing process according to another embodiment of the invention.

Figure 1:
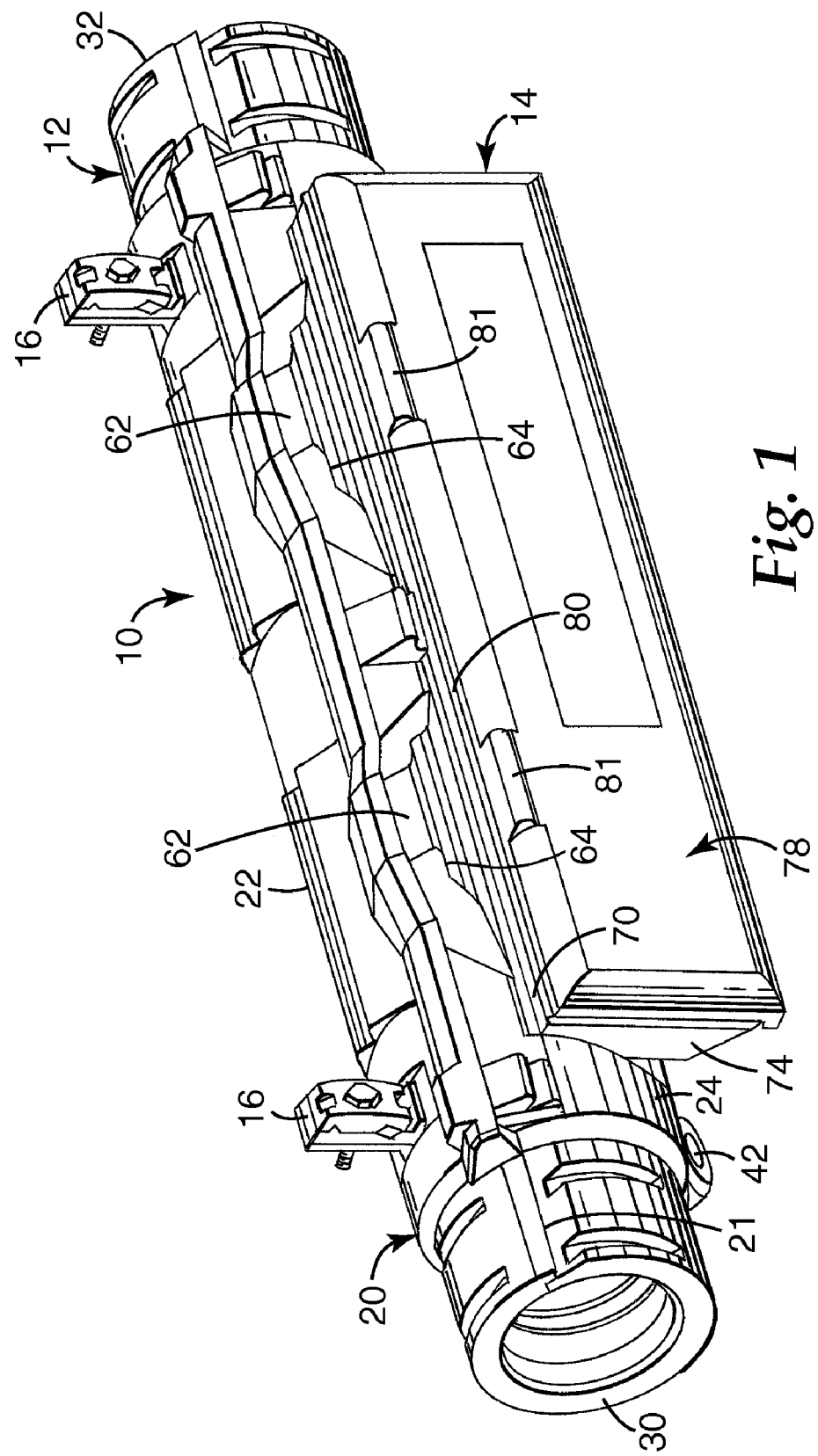
FIG. 1 is an isometric view of an example telecommunications enclosure, in particular a terminal closure 10.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DESCRIPTION OF THE PREFERRED EMBODIMENTS

A loopback test system and method of testing a telecommunications network is described herein. The loopback test system and method can be utilized for loopback testing for both fiber telecommunication lines and wire telecommunications lines. While the application often refers to a "fiber loopback test system" in an exemplary embodiment, it will be apparent to one of ordinary skill in the art given the present description that the loopback testing system and method described below can be utilized for network testing of fiber-based and wire-based networks. As is also apparent given the present description, by utilizing a telecommunications enclosure, such as a terminal or terminal closure or splice closure having a loopback test system, individual fiber/wire lines can be tested from a central communications facility, such as from a FDH or central office, at any time after installation of the terminal or terminal closure or splice closure. A second technician is not required to be present at the terminal or terminal closure or splice closure during loopback testing.

Figure 2:
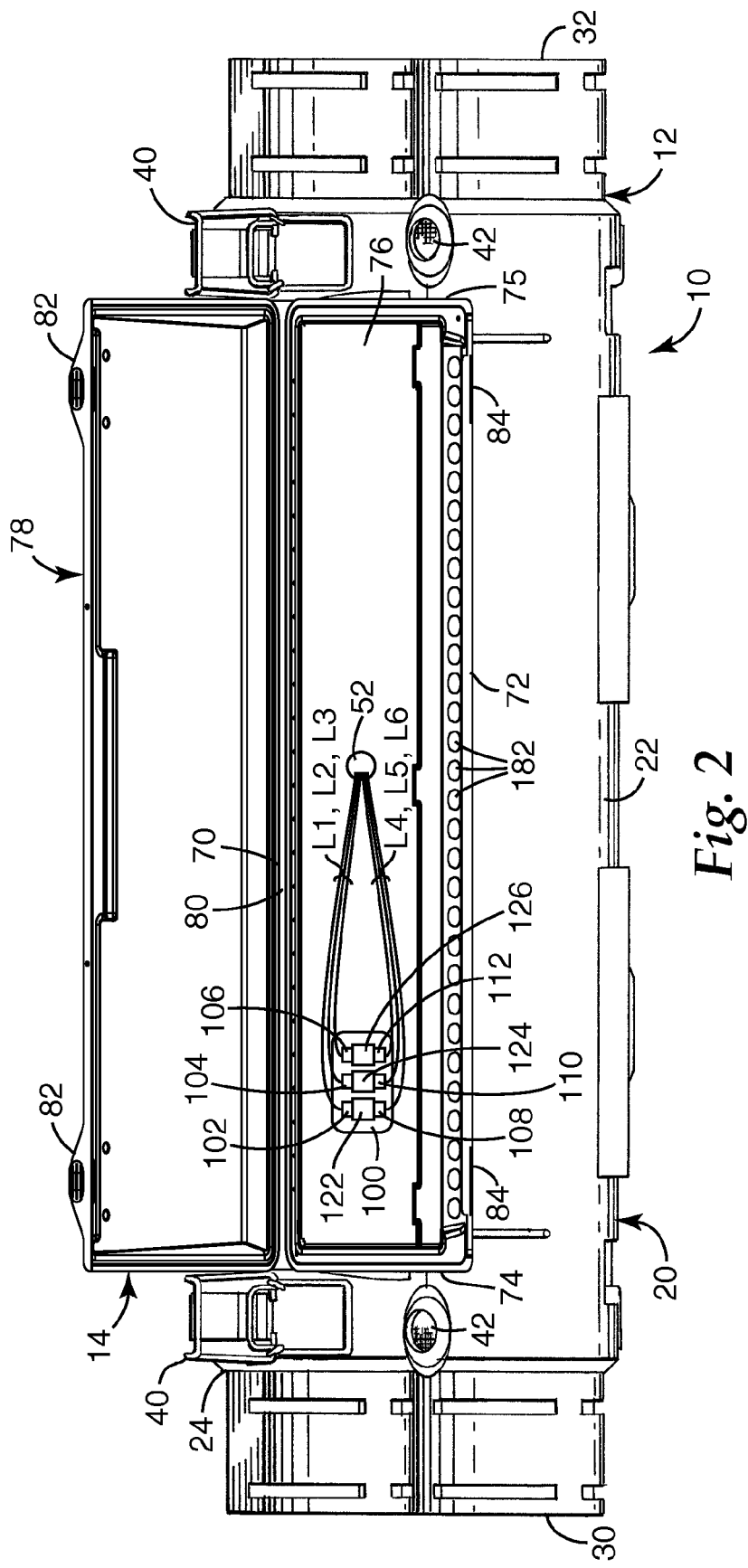
FIG. 2 is another isometric view of the example telecommunications enclosure that includes a loopback test system according to an embodiment of the invention.

FIGS. 1 and 2 show an exemplary telecommunications enclosure, in this example a terminal 10, having a housing that encloses an integral splice section or closure 12 and a terminal section or closure 14. The terminal 10 also includes a testing station adapted to provide for loopback testing. A fiber loopback testing station 100 is shown in particular in FIGS. 2 and 3B. Although the fiber loopback testing station 100 is described with reference to exemplary terminal 10, the loopback testing station 100 may also be included in terminal 200 shown in FIG. 4 or in other terminal constructions used for aerial, buried, underground, and indoor applications, and such as is described in commonly owned U.S. Pat. No. 7,075,013, incorporated by reference herein in its entirety. In addition, although testing station 100 is referred to as a "fiber" station, it can also be utilized with wire communication lines (e.g., copper lines), as would be apparent to one of skill in the art given the present description.

As illustrated, terminal 10 is an above-grade (i.e., above-ground) enclosure, and is further adapted to be suspended from a support cable (not shown) by, for example, of a pair of hangers 16. In other embodiments, terminal 10 may be a below-grade (i.e., below-ground) enclosure.

Splice closure 12 comprises a casing 20 which may be opened along an edge or opening seam 21, having mating ridges and grooves to form a labyrinth-type seal for restricting the ingress of dirt, water, bugs, and the like, into casing 20. Generally, casing 20 comprises first and second casing sections 22, 24 that are rotatably connected to one another along a hinge line. Preferably, casing 20 is molded from a suitable polymer material, such as polyethylene or the like. In this manner, the hinge may be integrally formed with casing sections 22, 24 when casing 20 is molded. Casing 20 may be made by any conventional molding technique, such as blow molding, injection molding, and the like. Each section 22, 24 is approximately one half of casing 20. That is, each of sections 22, 24 is substantially semi-cylindrical in configuration.

As seen in FIG. 1, casing 20 has an elongated, substantially cylindrical shape with first and second opposite ends 30, 32. End seals 34 (best seen in FIG. 2) are disposed at first and second ends 30, 32 for receiving and sealing around cables (not shown) entering casing 20 at first and second ends 30, 32. The cylindrical casing 20 is maintained and secured in a closed condition by latch or fastening device 40. Fastening device 40 may be any of a variety of conventional arrangements whereby section 22 may be selectively secured to section 24 along seam 21. In the embodiment shown in FIG. 2, fastening device 40 includes an actuator handle and securing latch forming a toggle latch. Thus, casing 20 may be readily closed and opened, as desired, to provide access to an interior of casing 20.

Access to the enclosed splice area within casing 20 is facilitated by the rotational position of first casing section 22 relative to second casing section 24. In particular, first and second sections 22, 24 of casing 20 are oriented such that when casing 20 is opened, a substantially unobstructed view is provided into the splice area inside casing 20 (see FIG. 2). This unobstructed view can be accomplished by preferred positioning of the hinge line relative to the location of hangers 16. In one embodiment, the hinge line is positioned between about 125° to 145°, and preferably about 135°, from attachment points of hangers 16 for mounting the terminal 10 to a support cable (not shown).

In FIG. 2, splice closure 12 is depicted with casing 20 in the open position. End seals, which may be formed according U.S. Pat. No. 4,857,672, assigned to assignee of this application and incorporated by reference herein, are supported in recesses in first and second ends 30, 32 of section 22 such that the end seals, upon receiving a cable therethrough, can be retained adjacent first and second ends 30, 32, respectively. The end seals can be engaged and sealed by cooperating recessed areas at the first and second ends 30, 32 of section 24 when the sections 22, 24 are in the closed position.

Section 24 of casing 20 optionally includes openings 42 which form drains in the lower portion of casing 20. Openings 42 may be screen covered and include a filter to limit the ingress of dirt, water, bugs, and the like, into casing 20. In embodiments where terminal 10 is a below-grade enclosure, openings 42 are preferably omitted.

Section 24 of casing 20 can also include a generally planar support surface for joining to and supporting thereon terminal closure 14. The support surface (not shown) can be generally flat, inside and outside of casing 20. The support surface can be formed with at least one opening 52 through which telecommunication lines, such as optical fibers or copper wires may pass from splice closure 12 into terminal closure 14. The support surface can be positioned on a side of casing 20 below opening seam 21, such that the terminal closure 14 supported thereon is readily accessible from the side or front of terminal 10. Section 24 optionally supports on its outer surfaces a plurality of drop wire strain relief brackets which support drop wires (not shown) entering terminal closure 14.

Terminal closure 14 can be joined to casing 20 at the support surface by any suitable device to make splice closure 12 and terminal closure 14 a unitary structure. If splice closure 12 and terminal closure 14 are first formed as separate units, suitable devices for making splice closure 12 and terminal closure 14 a unitary structure include, for example, joining splice closure 12 and terminal closure 14 using pop rivets, machine screws, bolts, heat welding, sonic welding, and the like. Splice closure 12 and terminal closure 14 may alternately be joined to form a unitary structure by molding the closures 12, 14 together as a single structure, rather than first forming them as separate units.

The support surface is positioned to place terminal closure 14 on a side of casing 20 when terminal 10 is suspended from a support cable (not shown). Terminal closure 14 comprises a top wall 70, a bottom wall 72, end walls 74, 75, back wall 76 and a lid 78. Lid 78 is hinged to top wall 70 of terminal closure 14 and is preferably hinged by a compression molded hinge 80. That is, hinge 80 is integral with top wall 70 and lid 78 of terminal closure 14. The terminal closure 14 may be molded from a suitable polymer material, such as polyethylene or the like. In this manner, hinge 80 can be readily formed integrally with the walls and lid of terminal closure 14 when molded. Terminal closure 14 may be formed by any conventional molding technique, such as by blow molding, injection molding, and the like.

Lid 78 can be provided with detents 81 on its outer surface adjacent hinge 80, and the outer wall of casing 20 can be provided with projections 62 having concave portions defining recesses 64. Detents 81 cooperate with recesses 64 in casing 20 to maintain lid 78 in an open and raised position when lid 78 is raised sufficiently by, for example, a service technician working on the contents of terminal closure 14. The flexibility of the polymer material forming splice closure 12 and terminal closure 14 is sufficient to permit detent 81 to enter recesses 64 and thereby secure lid 78 in the raised open position. Lid 78 and bottom wall 72 have cooperating latches 82, 84 to hold lid 78 in a closed position.

In use, terminal 10 is used to enclose a telecommunication cable at points where the cable is "spliced into" for distribution of a signal to one or more locations. It should be noted that the phrase "spliced into" as used herein is understood and intended to include any way in which a signal in a telecommunication cable is routed away from the cable for distribution to one or more locations. In practice, the telecommunication cable may be spliced, split, tapped, coupled, and the like. For example, a telecommunication cable may contain a plurality of data lines. At a predetermined point, the cable is spliced into and signals from one or more of the plurality of data lines are routed from the main cable. This may occur, as an example, in a telephone network in which a primary or "trunk" telecommunication cable is routed through an area, and periodically one or more individual data lines are distributed to "branches" of the network. The branches may be further distributed until the network reaches individual homes, businesses, offices, and so on. The distributed lines are often referred to as drop lines or distribution lines.

In this particular example, the branches from splice closure 12 can extend through port 52 and can include lines L1-L6 (a smaller number or a greater number of data lines may also be branched off into terminal closure 14). Lines L1-L6 further include connection devices 102-112 mounted on the terminal ends of the lines. These branches can eventually be coupled to a corresponding number of drop lines (not shown), which can enter terminal closure 14 through openings or cutouts 182.

In the example of a fiber optic telecommunication cable, the main cable may contain a plurality of buffer tubes, with each buffer tube containing a plurality of individual optical fibers. At various points along the cable, it may be desired to branch off optical fibers of one or more buffer tubes, but not all of the optical fibers in the cable. The individual optical fibers of a buffer tube may be spliced directly to a corresponding drop line, or the individual optical fibers may be split, such as by using a splitter or coupler, so that the signals in a single fiber are distributed to more than one drop line. At this point, it should be noted that although terminal 10 is described herein primarily as used with fiber optic telecommunication cables, terminal 10 may be used with telecommunication cables in general, including electrically conductive (i.e., copper) cables, and terminal 10 is not limited to use with fiber optic cables. Each type of telecommunication cable has corresponding devices and methods for routing a signal away from the cable to a drop line, and each of those devices and methods are understood and intended to be included in references to "splices" and "splicing into." Fiber retention and splicing can be accomplished in the manner taught in co-pending U.S. application Ser. No. 10/916,332, incorporated by reference herein in its entirety.

Within terminal closure 14, the data lines (L1-L6) can be provided with connection devices 102-112. The connection devices can be used to connect data lines to each other for loopback testing, and also eventually for establishing connection with one or more drop lines (not shown) extending outside of the terminal closure 14. In the exemplary use of terminal 10 with a fiber optic cable, a connection device (e.g., 102) may terminate an individual optical fiber of the cable. Those skilled in the art will recognize that the connection devices 102-112 may be any of a variety of suitable devices. For example, connection devices 102-112 may be connectors such as a SC, DC, SC-DC, ST, FC, LC, MTP, or MTRJ connectors, to name a few, and may be, for example, either positive contact (PC) or an angled polished connectors (APC).

As is shown in FIG. 2, a fiber loopback testing station 100 is mounted in terminal closure 14 (e.g., by a conventional fastener) and includes an interconnection panel having a plurality of interconnect devices or couplings 122, 124, 126. The interconnect devices can comprise couplings that can mate SC, DC, SC-DC, ST, FC, LC, MTP, or MTRJ connectors to each other. Alternatively, the couplings can be configured as hybrid couplings to connect a first type of connector to a second type of connector. Fiber loopback testing station 100 can be formed from a metal or plastic, having a sufficient rigidity to provide support for devices 122, 124, 126. In this particular example, the number of interconnect devices is ½ the number of branches from splice closure 12.

Alternatively, a fiber loopback testing station 100 can be mounted in a splice closure, such as splice closure 12. In further alternatives, a fiber loopback testing station 100 can be located in a terminal used in a multi-dwelling unit applications and/or a pre-terminated terminal (i.e., a terminal that includes a pre-installed fiber optic stub cable with standard connectors).

In this example, accessing all of the connection devices at the same time may be desired or necessary, for example, during the installation of terminal 10 and the initial splicing of data lines. However, optical fibers and their connection devices are sensitive to their physical handling and the presence of debris such as dust, moisture, and the like. The fiber loopback testing station 100 can also protect the terminated ends of the lines prior to connection to drop lines when mounted on the test station 100.

Figure 4:
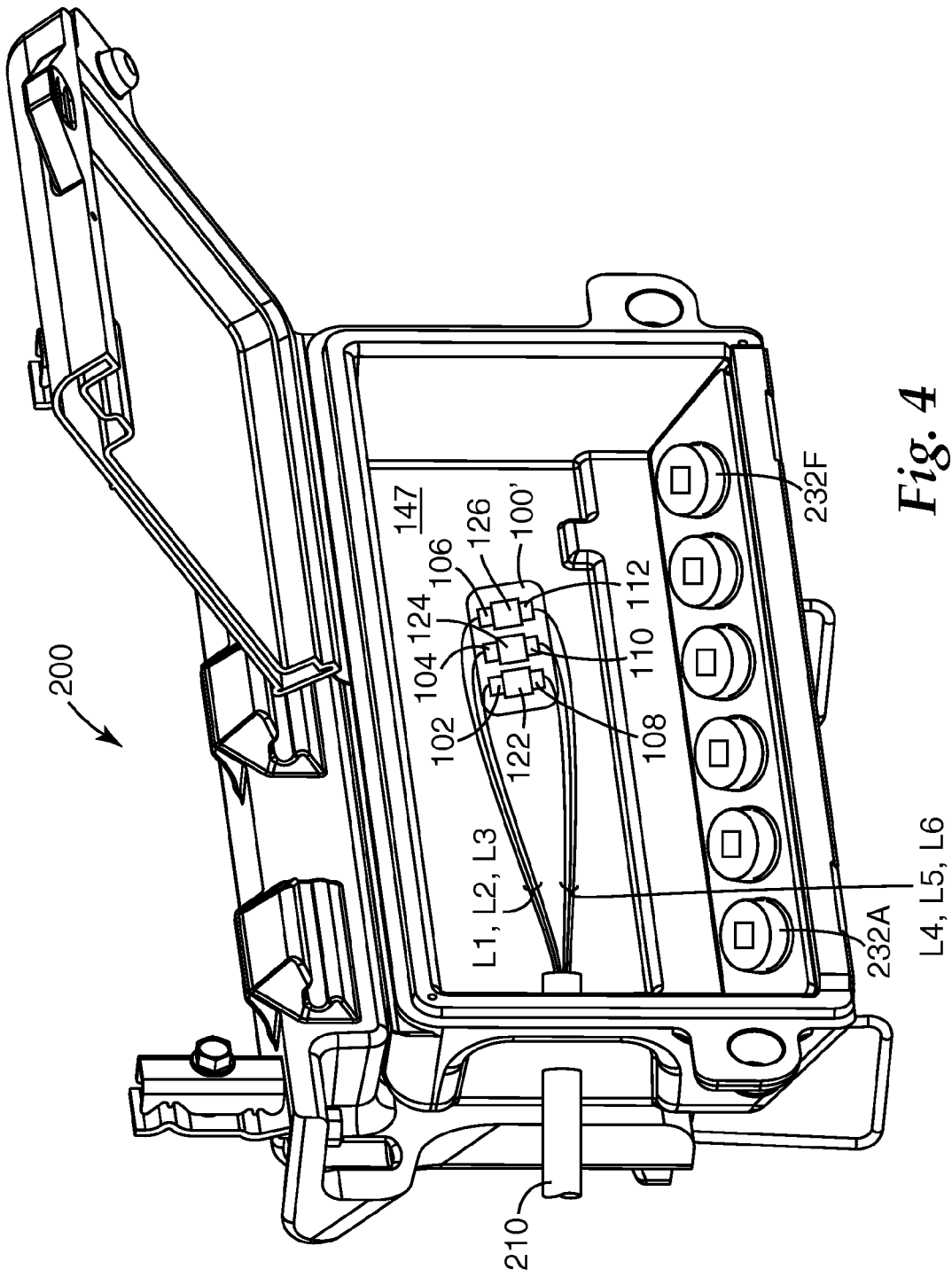
FIG. 4 is an isometric view of another example telecommunications enclosure, a terminal 200, that includes a loopback test system according to another embodiment of the invention.

As mentioned above, the fiber loopback testing station 100 can be utilized with other terminal constructions. For example, FIG. 4 illustrates a front isometric view of aerial terminal 200 according to an alternative embodiment of the present invention. Structure 200 can be constructed in accordance with the description provided in pending U.S. patent application Ser. No. 11/145,079, incorporated by reference herein. Of importance with respect to the present description, a fiber loopback testing station 100' can be mounted within terminal 200, such as on back wall 147. Distribution cable 210 can be provided from a separated splice closure, fiber terminal closure, or FDH. When the network service provider secures a new customer, the technician can re-enter the terminal and connect a particular distribution line from cable 210 (e.g., L1) to a drop line (not shown), for example by connecting the distribution lines and drop lines to couplings, such as couplings 232A-232F.

Alternatively, additional loopback testing stations can further be housed in a fiber distribution hub (FDH) cabinet, a fiber distribution terminal (FDT), or a fiber terminal closure.

According to another exemplary embodiment, a method to test a fiber optic network is described herein. This method can be used as part of or separate from installation and service activation testing in a bi-directional manner for fiber-to-the-premises, -building, -home, -curb, or -node (FTTP, FTTB, FTTH, FTTC, and FTTN) networks. The loopback testing method can be conducted from a single location, such as a central communications facility. FIG. 3B provides an illustration of one such loopback test.

Currently, after installation, a telecommunications line, such as L1 shown in FIG. 3A, can be disposed in a terminal 10. A first technician would transmit a signal from a central facility, e.g., a FDH 150. A second technician, located at terminal 10, would read the signal to determine signal loss. Alternatively, the second technician located at terminal 10 would send a signal along L1 that is received/measured at FDH 150.

In contrast, the loopback test method of the present description does not require a second technician. In particular, the loopback test method comprises providing a number of couplings that allow interconnection of terminated fibers, such as testing station 100. These couplings can be used to loop a single distribution fiber with a connectorized end from the FDH 150 to another fiber terminated in the same terminal to conduct the bidirectional testing. Upon service activation, the connectorized fiber is moved into service. The loopback testing is performed by connecting one distribution fiber to another distribution fiber or a splitter output fiber to another splitter output fiber at the same location thus looping it back to the point of testing. For example, with a 6-port fiber terminal closure, such as shown in FIGS. 2 and 3B, the testing process can be as follows:

L1 is connected to L6,
L2 is connected to L5, and
L3 is connected to L4.

It is noted that the loopback process could also be L1 connected to L2, etc, where the connections of the data lines can be performed in a known or predetermined pattern.

Bidirectional testing is then conducted on the new loopback links by a single technician with one test set from a centralized facility (here at the FDH 150). The technician connects L1 to a transmitter port at the FDH (not shown) and connects L6 to a receiver port at the FDH (not shown). The test signal can be sent along L1 (as shown in FIG. 3A), and the return signal can return on L6 (as shown in FIG. 3B). Further, the lines can be reversed to run the test in the opposite direction (e.g., transmitting along L6 and receiving along L1).

In addition, the fiber loopback testing system and method can provide for optical time domain reflectometry testing. For example, each coupling 122, 124, 126 can comprise a known optical loss (e.g., 3 dB loss). Thus, when testing L1, if a significantly reduced signal is returned, the known loss of coupling 122 can be used to identify the approximate location of the significant loss.

As mentioned above, a fiber loopback testing station 100 can be located in a fiber distribution terminal (FDT), such as is used in a multi-dwelling unit applications and pre-terminated terminals (i.e., terminals the include pre-installed fiber optic stub cable with standard connectors). For example, an exemplary stubbed terminal can be a re-enterable terminal with drop ports and a cable stub with bare fibers on one end and a pre-terminated (e.g., factory installed) connector (e.g., a SCAPC connector) on the other end. Example stubbed terminals are available from 3M Company, Saint Paul, Minn. (Fiber Dome FDTP 08 Stubbed Terminal).

Thus, the fiber loopback testing system and method disclosed herein can reduce (in at least man-hours) the effort and cost needed to qualify the network since only one technician may be required and the testing can be done from a centralized facility (FDH or CO). This method also provides for faster network deployment, as the technicians can now spend more time installing the network. For example, bidirectional optical return loss (ORL) testing and bidirectional end-to-end optical loss testing can be performed from a central facility at any time after installation of the terminal in the network.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the mechanical, optical, and opto-mechanical arts will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A telecommunications enclosure comprising:
a housing for retaining telecommunication lines therein, the housing including at least one of a splicing closure and a terminal closure, wherein the enclosure includes a loopback testing station disposed within the housing having at least one coupling mounted therein, the coupling adapted to receive a first terminated end of a first telecommunication line and adapted to receive a second terminated end of a second telecommunication line, wherein the first and second telecommunication lines are coupled to a central telecommunications facility.

2. The telecommunications enclosure of claim 1, wherein the at least one coupling includes a predetermined loss.

3. The telecommunications enclosure of claim 1, wherein the loopback testing station comprises a plurality of couplings mateable with at least one of SC, DC, SC-DC, ST, FC, LC, MTP, and MTRJ connectors.

4. The telecommunications enclosure of claim 1, wherein the housing comprises a splice closure and a terminal closure.

5. The telecommunications enclosure of claim 1, wherein the telecommunications enclosure comprises at least one of an aerial, buried, underground and indoor fiber terminal closure.

6. The telecommunications enclosure of claim 1, wherein the telecommunications lines comprise optical fibers.

7. The telecommunications enclosure of claim 1, wherein the loopback testing station comprises an interconnection panel having a plurality of couplings.

8. The telecommunications enclosure of claim 7, wherein first and second telecommunication lines are directly coupled to each other via one of the plurality of couplings.

9. The telecommunications enclosure of claim 1, wherein the housing comprises a pre-terminated terminal.

10. A telecommunications network, comprising:
a telecommunications enclosure for retaining telecommunication lines therein, the telecommunications enclosure including at least one of a splicing closure and a terminal closure, wherein the enclosure includes a loopback testing station disposed within the enclosure having at least one coupling mounted therein, the coupling adapted to receive a first terminated end of a first telecommunication line and adapted to receive a second terminated end of a second telecommunication line; and
a central communication facility coupled to the first and second telecommunications lines.

11. The telecommunications network of claim 10, wherein the at least one coupling includes a predetermined loss.

12. The telecommunications network of claim 10, wherein the loopback testing station comprises a plurality of couplings mateable with at least one of SC, DC, SC-DC, ST, FC, LC, MTP, and MTRJ connectors.

13. The telecommunications network of claim 10, wherein the enclosure comprises a splice closure and a terminal closure.

14. The telecommunications network of claim 10, wherein the central communications facility is one of a fiber distribution hub (FDH), a fiber distribution terminal (FDT), and a central office.

15. The telecommunications network of claim 12, wherein the loopback testing station comprises one half as many couplings as terminated fiber connectors.

16. The telecommunications network of claim 10, wherein the loopback testing station comprises an interconnection panel having a plurality of couplings.

17. A method of testing a telecommunications network, comprising:
   providing a telecommunications enclosure for retaining telecommunication lines therein, the telecommunications enclosure including at least one of a splicing closure and a terminal closure, wherein the enclosure includes a loopback testing station disposed within the enclosure having at least one coupling mounted therein, mounting a first terminated end of a first telecommunication line to a first end of the coupling and mounting a second terminated end of a second telecommunication line to a second end of the coupling, wherein the first telecommunications line is optically coupled to the second telecommunication line;
   sending a test signal along the first telecommunication line from a central facility of the network; and
   receiving the test signal along the second telecommunication line at the central facility of the network.

18. The method of claim 17, wherein the at least one coupling includes a predetermined loss, further comprising:
   determining a location of an optical fault.

19. The method of claim 17, further comprising:
   performing a bidirectional end-to-end optical loss test from the central facility.

20. The telecommunications network of claim 16, wherein first and second telecommunication lines are directly coupled to each other via one of the plurality of couplings.

* * * * *